W. V. TURNER.
BRAKE PIPE VENT VALVE.
APPLICATION FILED MAR. 9, 1917.
1,281,432.
Patented Oct. 15, 1918.
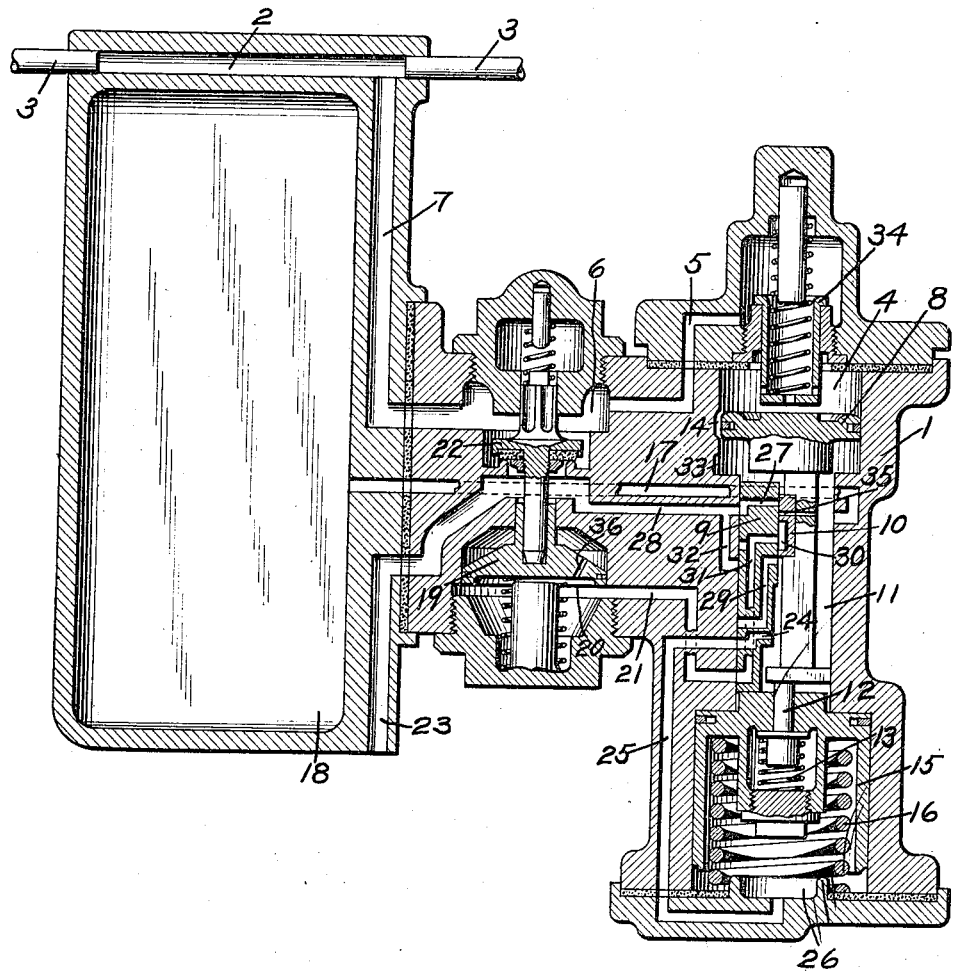
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA.

BRAKE-PIPE VENT-VALVE.

1,281,432.   Specification of Letters Patent.   Patented Oct. 15, 1918.

Application filed March 9, 1917. Serial No. 153,543.

*To all whom it may concern:*

Be it known that I, WALTER V. TURNER, a citizen of the United States, residing at Wilkinsburg, in the county of Allegheny and State of Pennsylvania, have invented new and useful Improvements in Brake-Pipe Vent-Valves, of which the following is a specification.

This invention relates to fluid pressure brakes, and more particularly to an automatic fluid pressure brake, in which the brakes are applied by effecting a reduction in brake pipe pressure.

Various valve devices are employed in connection with fluid pressure brakes, in which there is provided a piston subject to the opposing pressures of the brake pipe and a chamber adapted to be charged from the brake pipe, such as the ordinary triple valve device and brake pipe vent valve devices.

A valve device of the above character located near the brake valve device is subjected to more rapid fluctuations in brake pipe pressure than when located farther back in the train and if the brake pipe pressure is suddenly increased, as when the brake valve is turned to release position, the pressure in the chamber of the valve device may be correspondingly increased. If this rate of flow to the brake pipe be suddenly interrupted, as by turning the brake valve to running position, the tendency of the brake pipe pressure to equalize throughout the train may cause such a sudden rate of reduction in brake pipe pressure at the head end of the train, that the valve devices near the brake valve may be shifted to emergency position and cause an emergency application of the brakes when not intended.

The principal object of my invention is to prevent emergency action of a valve device controlled by brake pipe pressure under fluctuations in brake pipe pressure of the above character.

In the accompanying drawing, the single figure is a central sectional view of a brake pipe vent valve device embodying my invention.

My invention is shown in the drawing as applied in connection with a vent valve device comprising a casing 1 having a passage 2 forming part of the usual automatic brake pipe 3.

Within the casing 1 is a piston chamber 4 connected by passage 5, vent valve chamber 6, and passage 7 with brake pipe passage 2, and containing a piston 8.

The piston 8 is adapted to operate a main slide valve 9 and an auxiliary slide valve 10 mounted on and having a movement relative to the main slide valve, the valves being contained in a valve chamber 11, which is connected through passage 17 with a chamber 18.

A stop 12 subject to the pressure of a spring 13 yieldingly maintains piston 8 in normal position, opening a feed groove 14 around the piston and said stop is mounted in a second stop 15 subject to the pressure of a spring 16.

A quick action piston 19 is mounted in piston chamber 20 connected to a passage 21, leading to the seat of slide valve 9, and said piston is adapted to operate a vent valve 22 contained in valve chamber 6, for venting fluid from the brake pipe to an atmospheric exhaust passage 23.

If the brake pipe is charged with fluid under pressure at a slow rate, piston 8 will remain in its normal position, as shown in the drawing, and fluid will flow from piston chamber 4 through feed groove 14, charging the valve chamber 11, and thence through passage 17 to chamber 18.

In the normal position, a port 24 in slide valve 9, registers with passage 25, leading to the chamber 26 at the spring side of stop 15, so that said chamber is normally charged with fluid under pressure.

If the brake pipe is charged at a rapid rate, exceeding the capacity of feed groove 14, the piston 8 will be shifted inwardly, moving the stop 12 against the resistance of spring 13 until the piston stem engages the stop 15. This movement of the piston 8 closes the feed groove 14 and operates the auxiliary valve 10, so as to uncover a port 27 in slide valve 9 which registers with passage 28 leading to exhaust passage 23.

Fluid is thereupon vented from valve chamber 11 and chamber 18 to the atmosphere.

When the pressure in valve chamber 11 and chamber 18 has been thus reduced to a predetermined degree, the higher brake pipe pressure in piston chamber 4 will force the stop 15 outwardly against the resistance of spring 16, the fluid pressure in chamber 26 having reduced through passage 25 and port 24 with the valve chamber pressure.

The piston 8 then assumes its innermost position, shifting slide valve 9, so that passage 25 is connected through a port 29, cavity 30 in auxiliary valve 10, and port 31, with a passage 32, leading to passage 28, and fluid is therefore vented from chamber 26 to the atmosphere, so that stop 15 will be held in this position by fluid pressure in valve chamber 11.

The construction is so designed that piston 8 will remain in its intermediate position with feed groove 14 closed, until the excess pressure in the brake pipe has had time to equalize throughout the train. Upon movement of piston 8 to its innermost position, a feed groove 33 around the piston is opened, permitting fluid from the brake pipe to equalize into valve chamber 11 and chamber 18, and when the fluid pressures on opposite sides of the piston 8 have substantially equalized, the spring 13 acts on stop 12 to shift the piston outwardly and close feed groove 33. The auxiliary valve 10 is also moved to cut off communication from chamber 26 to the atmosphere and to open port 29 to valve chamber 11, allowing the fluid pressures on opposite sides of the stop 15 to equalize, so that spring 16 can force the stop 15 and piston 8 back to normal position, in which feed groove 14 is opened.

By this means the overcharge of the valve chamber 11 and chamber 18 is prevented when an excess pressure is supplied to the brake pipe, as in release position of the brake valve, so that if the brake valve is thereafter turned to running position, the reduction in the rate of flow to the brake pipe will not effect the emergency movement of the vent valve device.

If the train is unusually long, the excess pressure at the head end of the train may continue for a longer period, so that when the piston 8 is forced to its innermost position, there may still exist a higher brake pipe pressure at the head end of the train than farther on the train, so that the chamber 11 may be overcharged by flow through feed groove 33. This overcharge is prevented from causing undesired emergency action by the reduction in pressure in chamber 11 upon the initial movement of piston 8, due to the equalization of fluid from valve chamber 11 and chamber 18 into the chamber 26, which is then at atmospheric pressure.

If the above described reduction in pressure in valve chamber 11 is not sufficient, the piston 8 may be moved outwardly beyond the normal position when the brake valve is turned to running position, but if this happens, the piston will engage a spring stop 34 and the auxiliary valve 10 will be shifted so that a port 35 therein will register with port 27 in the main valve 9. Fluid is then vented from valve chamber 11 and chamber 18 to the atmosphere, thus insuring a rate of reduction in chamber pressure which will prevent movement of the valve device to emergency position.

When a service rate of reduction in brake pipe pressure is made, the piston 8 will move out to engage the stop 34 and permit fluid to be vented from valve chamber 11 to the atmosphere, as hereinbefore described, so that the pressure in said chamber reduces at the same rate as the brake pipe pressure is reducing and movement of the parts to emergency position is prevented.

When an emergency rate of reduction in brake pipe pressure is effected, the capacity of the feed groove 14 is exceeded and the piston 8 is then shifted to emergency position, in which passage 21 is opened to valve chamber 11, so that fluid under pressure is supplied to the quick action piston 19, operating the same to open vent valve 22 and vent fluid from the brake pipe, thereby effecting a local sudden reduction in brake pipe pressure.

Fluid supplied to the quick action piston 19 slowly escapes through the restricted port 36 in the piston to the atmosphere, so that after a predetermined time, the fluid pressure on the piston reduces sufficiently to permit the quick action piston to return to normal position, closing the vent valve 22 so that the brake pipe pressure may then be increased to effect the release of the brakes.

Ordinarily, it will not be necessary to employ a device of the above character except at the head end of the train, since farther back in the train, the fluctuations in brake pipe pressure will not be extreme enough to require the use of same.

Having now described my invention, what I claim as new and desire to secure by Letters Patent, is:

1. In a fluid pressure brake, the combination with a brake pipe, of a valve device subject to the opposing pressures of the brake pipe and a chamber adapted to be charged from the brake pipe and operated upon an increase in brake pipe pressure for venting fluid from said chamber.

2. In a fluid pressure brake, the combination with a brake pipe, of a valve device subject to the opposing pressures of the brake pipe and a chamber adapted to be charged from the brake pipe and operated at a predetermined rate of increase in brake pipe pressure for venting fluid from said chamber.

3. In a fluid pressure brake, the combination with a brake pipe, of a valve device subject to the opposing pressures of the brake pipe and a chamber adapted to be charged from the brake pipe and adapted at a predetermined rate of increase in brake pipe pressure to first open communication for venting fluid from said chamber and then close said communication.

4. In a fluid pressure brake, the combination with a brake pipe, of a valve device subject to the opposing pressures of the brake pipe and a chamber adapted to be charged from the brake pipe and having a normal position in which fluid is supplied from the brake pipe to said chamber and operated upon a predetermined increase in brake pipe pressure for first opening communication for venting fluid from said chamber and then closing said communication and again permitting the supply of fluid from the brake pipe to said chamber.

5. In a fluid pressure brake, the combination with a brake pipe, of a valve device comprising a piston subject to the opposing pressures of the brake pipe and a chamber and valve means operated by said piston for effecting an emergency application of the brakes, said piston having a normal position for opening a feed groove from the brake pipe to said chamber and movable upon a predetermined increase in brake pipe pressure for operating said valve means to vent fluid from said chamber, and a yielding stop for defining the normal position.

6. In a fluid pressure brake, the combination with a brake pipe, of a valve device comprising a piston subject to the opposing pressures of the brake pipe and a chamber and valve means operated by said piston for effecting an emergency application of the brakes, said piston having a normal position for opening a feed groove from the brake pipe to said chamber and movable upon a predetermined increase in brake pipe pressure for operating said valve means to vent fluid from said chamber, and a yielding stop for defining the chamber venting position.

7. In a fluid pressure brake, the combination with a brake pipe, of a valve device comprising a piston subject to the opposing pressures of the brake pipe and a chamber and valve means operated by said piston for effecting an emergency application of the brakes, said piston having a normal position for opening a feed groove from the brake pipe to said chamber and movable upon a predetermined increase in brake pipe pressure for operating said valve means to vent fluid from said chamber, a yielding stop for defining the normal position, and a yielding stop for defining the chamber venting position.

8. In a fluid pressure brake, the combination with a brake pipe, of a valve device comprising a piston subject to the opposing pressures of the brake pipe and a chamber and valve means operated by said piston for effecting an emergency application of the brakes, said piston having a normal position for opening a feed groove from the brake pipe to said chamber and movable upon a predetermined increase in brake pipe pressure for operating said valve means to vent fluid from said chamber, a yielding stop for defining the chamber venting position, and a port controlled by said valve means for venting fluid from one side of said stop.

9. In a fluid pressure brake, the combination with a brake pipe, of a valve device having a piston subject to the opposing pressures of the brake pipe and a chamber and having two positions in which fluid is fed from the brake pipe to said chamber and an intermediate position in which fluid is vented from said chamber.

10. In a fluid pressure brake, the combination with a brake pipe, of a valve device having a piston subject to the opposing pressures of the brake pipe and a chamber and having two positions in which fluid is fed from the brake pipe to said chamber and an intermediate position in which fluid is vented from said chamber and yielding stop means for defining the venting position.

In testimony whereof I have hereunto set my hand.

WALTER V. TURNER.

Copies of this patent may be obtained for five cents each, by addressing the "Commissioner of Patents, Washington, D. C."